United States Patent [19]

Chen

[11] Patent Number: 5,526,183
[45] Date of Patent: Jun. 11, 1996

[54] HELMET VISOR DISPLAY EMPLOYING REFLECTIVE, REFRACTIVE AND DIFFRACTIVE OPTICAL ELEMENTS

[75] Inventor: Chungte W. Chen, Irvine, Calif.

[73] Assignee: Hughes Electronics, Los Angeles, Calif.

[21] Appl. No.: 168,785

[22] Filed: Nov. 29, 1993

[51] Int. Cl.$^6$ ................................................ G02B 27/14
[52] U.S. Cl. ........................... 359/629; 359/630; 359/631
[58] Field of Search ........................... 359/14, 19, 629, 359/630, 631, 632, 633; 345/7, 8

[56] References Cited

U.S. PATENT DOCUMENTS

| | | | |
|---|---|---|---|
| 3,940,204 | 2/1976 | Withrington | 359/8 |
| 4,218,111 | 8/1980 | Withrington | 359/630 |
| 4,669,810 | 6/1987 | Wood | 359/19 |
| 4,826,287 | 5/1989 | Cook | 345/7 |
| 4,961,626 | 10/1990 | Fournier, Jr. | 359/630 |
| 5,124,821 | 6/1992 | Antier | 359/630 |
| 5,299,063 | 5/1994 | Fritz | 359/631 |

OTHER PUBLICATIONS

G. J. Swanson, Binary Optics Technology: Theory and Design of Multilevel Diffractive Optical Elements, 14 Aug. 1989, pp. 25–39.

*Primary Examiner*—Georgia Y. Epps
*Assistant Examiner*—Ricky Mack
*Attorney, Agent, or Firm*—Michael W. Sales; Wanda K. Denson-Low

[57] ABSTRACT

An improved helmet visor display comprising three elements, including a tilted combiner, a refractive/diffractive relay module, and an image generator. The tilted combiner is a reflective-type combiner having either a spherical surface shape or a generalized aspheric surface shape. The relay module comprises a front-end collimating lens group, a pupil lens group in the middle, and a rear-end focusing lens group. The collimating lens group is comprised of one refractive doublet and one refractive-diffractive optical element. The combination of the refractive doublet and the refractive-diffractive optical element corrects for primary and secondary axial chromatic aberration, and significantly reduces higher order aberration as a result of power reduction in most lens elements. The pupil lens group comprises a conic or aspheric lens which reduces spherical aberration and enlarges the eye pupil. The focusing lens group comprises a refractive doublet and a wedge that relays the light emerging from the pupil lens group onto the image generator. A crown-flint refractive doublet in conjunction with a diffractive optical element may be employed in the focusing lens group to reduce primary and secondary lateral chromatic aberration and chromatic distortion. The wedge is used to reduce axial coma introduced by the tilted combiner.

13 Claims, 1 Drawing Sheet

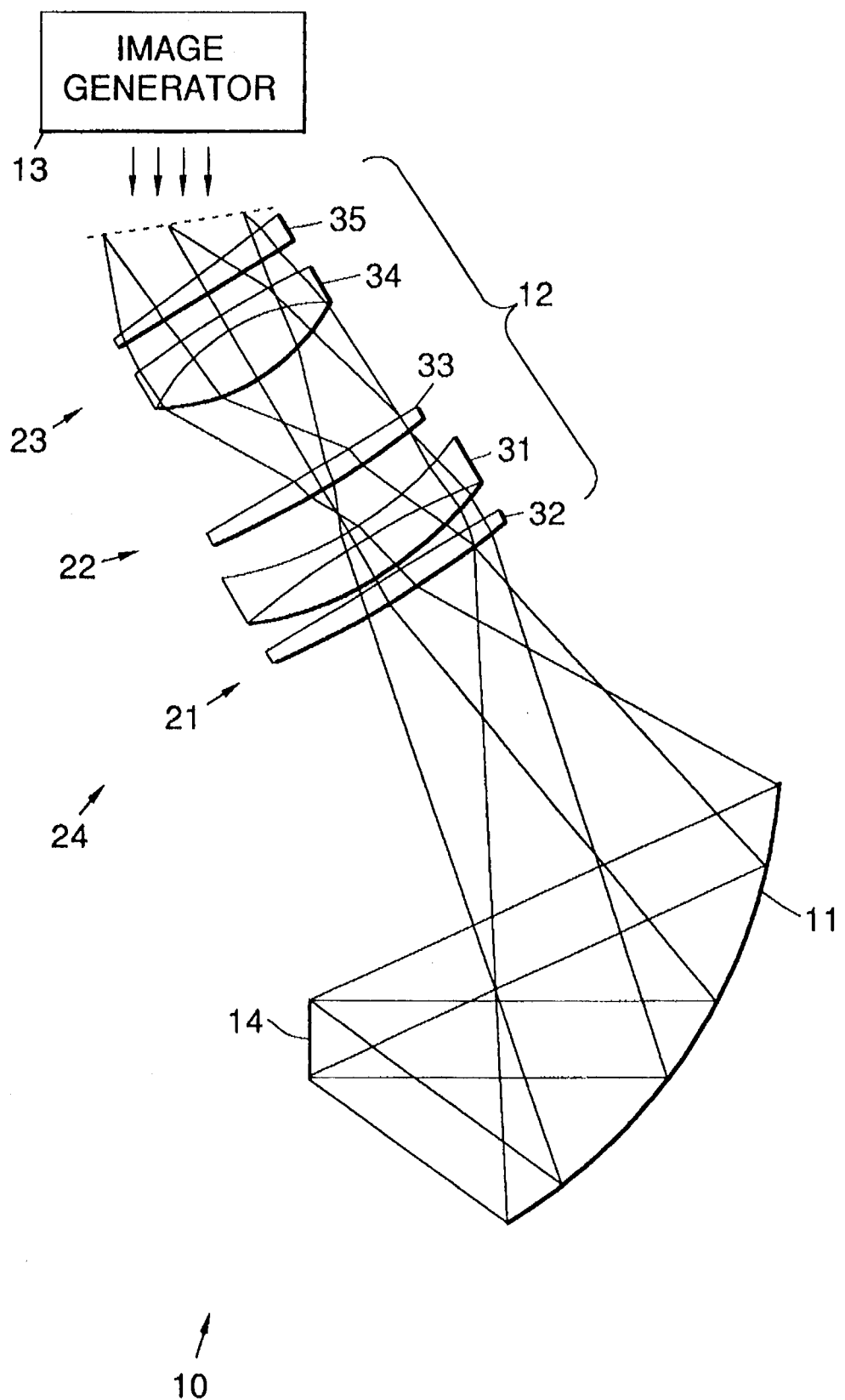

HELMET VISOR DISPLAY EMPLOYING REFLECTIVE, REFRACTIVE AND DIFFRACTIVE OPTICAL ELEMENTS

BACKGROUND

The present invention relates generally to head-up displays, and more particularly, to a helmet visor display that incorporates reflective, refractive and diffractive optical elements.

A typical conventional helmet visor display has three modules that include a combiner that acts as an eyepiece, a relay lens, and an image source generator. Three drawbacks are generally associated with the conventional helmet visor display: the relay lens is too complicated, the moment of inertia of the display is too large, and the pupil size is too small. Consequently, the conventional helmet visor display is relatively expensive to construct and is not comfortable to wear for long periods of time.

One conventional helmet visor display is disclosed in U.S. Pat. No. 3,940,204 entitled "Optical Display Systems Utilizing Holographic Lenses", issued to Withrington, and assigned to the assignee of the present invention. This optical display system includes three modules: one combiner, one relay module, and one image source generator module such as a cathode ray tube (CRT). Information displayed on the CRT is relayed by the relay module to form an intermediate image and then collimated by the combiner to generate an image at a comfortable position in front of a viewer. The optical design form of this helmet visor display system has several advantages. The relay module allows the size of the image generator to be small, and the combiner relays the eye pupil inside the relay module. Therefore, the size of the relay group is kept small.

However, there are several drawbacks associated with this conventional helmet visor display systems. The operating spectral bandwidth is somewhat narrow, the relay group is relatively complicated, the helmet visor display is relatively heavy, the moment of inertia is large, and the pupil size is relatively small. Consequently, conventional helmet visor displays are generally uncomfortable for users to wear for a long period of time.

The conventional high image quality helmet visor display optical system is generally very bulky and extremely expensive. The moment of inertia of the visor is also very large. Therefore, the user is very stressed and uncomfortable and unable to wear it for an extended period of time. In typical applications for helmet visor displays, such as for aircraft, simulators, and medical systems, for example, the availability of lightweight, low cost, and low center of gravity helmet visor displays are very critical. Unfortunately, conventional helmet visor displays available today cannot meet all these requirements.

Therefore, it is an objective of the present invention to provide an improved helmet visor display that incorporates reflective, refractive and diffractive optical elements, and that substantially eliminates the problems associated with conventional helmet visor displays outlined above.

SUMMARY OF THE INVENTION

In order to meet the above and other objectives, the present invention is an improved helmet visor display optical system. The helmet visor display comprises three elements, including a combiner, a relay module, and an image generator, such as a CRT. The combiner is generally tilted with respect to an optical axis of the image generator. The tilted combiner is a reflective-type combiner having either a spherical surface shape or a generalized aspheric surface shape.

The relay module comprises a front-end collimating lens group, a rear-end focusing lens group, and a pupil lens group disposed therebetween. The collimating lens group may be comprised of a refractive doublet and a refractive-diffractive optical element. The combination of the refractive doublet and the refractive-diffractive optical element corrects for primary and secondary axial chromatic aberration, and significantly reduces higher order aberration as a result of power reduction in most lens elements.

The pupil lens group comprises a conic or aspheric lens which reduces spherical aberration and enlarges the pupil size. The focusing lens group comprises a refractive doublet and a wedge that relays the light emerging from the pupil lens group onto the image generator. A crown-flint refractive doublet may be employed in the focusing lens group to reduce primary and secondary lateral chromatic aberration and chromatic distortion. The wedge is used to reduce axial coma introduced by the tilted combiner.

The present invention provides a very compact, lightweight and low moment of inertia helmet visor display optical system having a very wide field of view, a large pupil size, and broad spectral band, and a method of constructing same. The helmet visor display constructed in accordance with the present invention has approximately a 35 percent reduction in lens element count, weight and moment of inertia. In addition, the present helmet visor display has a much wider spectral band coverage and better image quality than conventional helmet visor display devices.

The present invention may be employed in military and commercial head-up display systems designed for aircraft and helicopter use, and for deployable simulators, artificial intelligence devices, virtual reality devices, air traffic control systems, and medical surgery systems, for example. The present helmet visor display is lightweight and has a low center of gravity. Therefore, it is more comfortable to wear for a long period of time.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which the sole FIGURE of the drawing illustrates a side view of the optical design of a helmet visor display optical system in accordance with the principles of the present invention.

DETAILED DESCRIPTION

Referring to the drawing FIGURE, it illustrates a side view of the optical design of a helmet visor display optical system 10, or helmet visor display 10, in accordance with the principles of the present invention. The helmet visor display 10 comprises three modules, including a combiner 11, a relay module 12, and an image generator 13, such as a CRT. The combiner 11 is generally tilted with respect to an optical axis of the image generator 13. The tilted combiner 11 is a reflective-type combiner 11 having either a spherical surface shape or a generalized aspheric surface shape. The helmet visor display 10 is designed to relay an image from the image generator 13 to an eye pupil 14 for viewing by a user or wearer of the helmet visor display 10. The helmet visor display 10 shown in the drawing FIGURE has a field of view of 50 degrees in elevation and 60 degrees in azimuth.

The relay module 12 comprises a front-end collimating lens group 21, a pupil lens group 22 in the middle, and a rear-end focusing lens group 23. Each lens group 21, 22, 23 comprises at least one positive power lens. To simplify the illustration, instead of tracing light rays from the image generator 13 to the eye pupil 14, light rays are traced from the eye pupil 14 to the image generator 13. The tilted combiner 11 and the collimating lens group 21 substantially form an afocal telescope 24. The afocal telescope 24 relays the eye pupil 14 close to the pupil lens group 22 to provide for spherical aberration correction. Consequently, the usable eye pupil 14 is enlarged. The focusing lens group 23 relays the beams onto the image generator 13. The construction of each lens group 21, 22, 23 of the relay module 12 is explained below.

The collimating lens group 21 is comprised of one refractive optical element 31 or doublet 31 and one refractive-diffractive optical element 32. The combination of the refractive doublet 31 and the refractive-diffractive optical element 32 corrects for primary and secondary axial chromatic aberration. More importantly, the use of the diffractive element in the collimating lens group 21 significantly reduces higher order aberration as a result of power reduction in most lens elements. Higher order aberration reduction is particular critical in the design of the helmet visor display 10. Even a small amount of higher order aberration can generate a large amount of binocular disparity errors such as divergence and convergence. Without the diffractive element, the design of the helmet visor display 10 would require at least four additional lenses in the relay module 12 to correct for chromatic and higher order aberration. This would add a significant amount of weight to the helmet visor display 10.

The pupil lens group 22 comprises a conic or aspheric lens 33 that reduces spherical aberration and enlarges the size of the eye pupil 14. The helmet visor display 10 shown in the drawing FIGURE is designed to be faster than f/1.5. Therefore, correction of third order as well as higher order spherical aberration is necessary. By disposing the conic or aspheric lens 33 comprising the pupil lens group 22 close to an intermediate pupil, third order and higher order spherical aberration is very effectively balanced. Consequently, the usable size of the eye pupil 14 is enlarged. In some applications, a diffractive optical element may be incorporated in the pupil lens group 22 to further correct primary and secondary axial chromatic aberration and spherochromatism. The pupil lens group 22 may also be decentered with respect to the collimating lens group 21 for correcting axial coma introduced by the tilted combiner 11.

The focusing lens group 23 comprises a refractive doublet 34 and a wedge 35 and relays light emerging from the pupil lens group 22 onto the image generator 13. A crown-flint refractive doublet 34 may be employed to reduce primary and secondary lateral chromatic aberration and chromatic distortion. The wedge 35 is used to reduce axial coma introduced by the tilted combiner 11. The diffractive optical element may also be incorporated in the focusing lens group 23 to further reduce primary and secondary lateral chromatic aberration and chromatic distortion.

The drawbacks associated with prior art helmet visor displays described in the background are substantially overcome by the helmet visor display 10 of the present invention. The advantages of the helmet visor display 10 constructed according to the principles of the present invention are that is very lightweight and compact, it has a large size eye pupil 14, it provides very good image quality, it has a very low moment of inertia, and it has a wide spectral bandwidth.

For the purposes of comparison, the conventional helmet visor display disclosed in U.S. Pat. No. 3,940,204 entitled "Optical Display Systems Utilizing Holographic Lenses" and developed by the assignee of the present invention is cited for reference. This conventional helmet visor display does not include diffractive or diffractive-refractive optical elements as are employed in the present invention. The operating spectral bandwidth of this conventional helmet visor display is somewhat narrow, the relay group is relatively complicated, and the pupil size is relatively small. Also, the helmet visor display is relatively heavy, and its moment of inertia is large, and the pupil size is relatively small. Consequently, this helmet visor display may be somewhat uncomfortable for users to wear for a long period of time.

Thus there has been described a new and improved helmet visor display that incorporates reflective, refractive and diffractive optical elements that is lightweight and compact, has a large size eye pupil, provides very good image quality, has a very low moment of inertia, and has a wide spectral bandwidth. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A helmet visor display comprising:
   an image source generator operable to generate an image
   a combiner; and
   a relay module comprising refractive elements; and at least one diffractive optical element, said image being relayed from said image generator to said combiner by said relay module;
   wherein the relay module is comprised of a front-end collimating lens group disposed close to the combiner, a rear-end focusing lens group disposed close to the image source generator, and a pupil lens group disposed therebetween, and wherein the collimating lens group and the focusing lens group are disposed on opposite sides of the pupil lens group to form a symmetric relay lens group, to partially self-compensate for asymmetric aberrations.

2. The helmet visor display of claim 1 wherein the relay module is disposed to generate an intermediate image from an image provided by the image generator that is collimated by the combiner to form an image pupil for viewing by a user.

3. The helmet visor display of claim 1 wherein the collimating lens group, pupil lens group, and the rear-end focusing lens group each comprises at least one positive power lens.

4. The helmet visor display of claim 1 wherein the collimating lens group is comprised of a refractive doublet and a refractive-diffractive optical element for correcting primary and secondary axial chromatic aberration, and significantly reduce higher order aberration in the helmet visor display.

5. The helmet visor display of claim 1 wherein the pupil lens group is comprised of at least one lens that is positioned relative to the intermediate image to reduce spherical aberration.

6. The helmet visor display of claim 5 wherein the at least one lens comprises a spherical lens that provides for third order and higher order spherical aberration correction.

7. The helmet visor display of claim 5 wherein the at least one lens comprises a conic lens that provides for third order and higher order spherical aberration correction.

8. The helmet visor display of claim 5 wherein the at least one lens comprises an aspheric lens that provides for third order and higher order spherical aberration correction.

9. The helmet visor display of claim 1 wherein the pupil lens group is comprised of a diffractive optical element that provides for axial chromatic aberration and spherochromatism correction.

10. The helmet visor display of claim 1 wherein the pupil lens group is decentered with respect to the collimating lens group to correct the axial coma introduced by the combiner.

11. The helmet visor display of claim 3 wherein the combiner has a spherical surface shape, and the radius of the combiner is adjusted such that the eye pupil is relayed to the pupil lens group of the relay lens module.

12. The helmet visor display of claim 1 wherein the focusing lens group comprises a crown-flint refractive doublet that reduces primary lateral chromatic aberration and chromatic distortion.

13. The helmet visor display of claim 1 wherein the wedge of the focusing lens group is used to reduce axial coma introduced by the combiner.

* * * * *